UNITED STATES PATENT OFFICE.

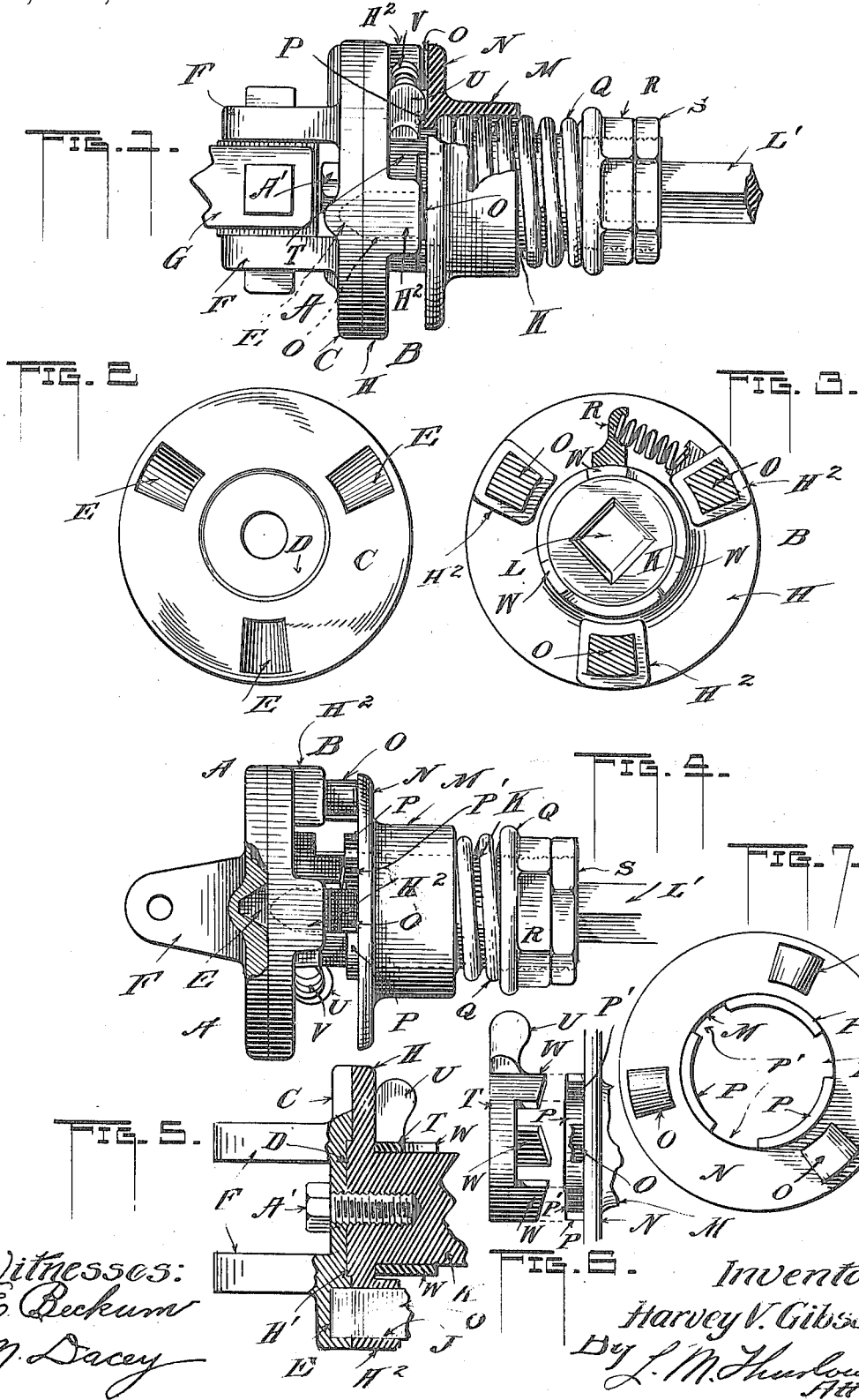

HARVEY V. GIBSON, OF WASHINGTON, ILLINOIS.

CLUTCH.

1,208,135.   Specification of Letters Patent.   Patented Dec. 12, 1916.

Application filed August 11, 1913. Serial No. 784,210.

*To all whom it may concern:*

Be it known that I, HARVEY V. GIBSON, citizen of the United States, residing at Washington, in the county of Tazewell and State of Illinois, have invented certain new and useful Improvements in Clutches; and I do hereby declare that the following is a full, clear, and exact description of the invention, which will enable others skilled in the art to which it appertains to made and use the same.

This invention relates to a clutch.

It relates more particularly to a clutch employed between a driving and a driven member, the parts of which are adapted to automatically disengage under overload whereby the said driving and driven members will be automatically disengaged and prevented from reëngaging.

One of the objects of the invention is to introduce a clutch between a source of power and a driven element so arranged that automatic disengagement of the power and the driven element when the latter becomes overloaded beyond a predetermined point will result.

Another object is to construct a clutch that will automatically separate the power from the driven element when the latter becomes overloaded beyond a predetermined point, the clutch including a portion to automatically enter between and hold the clutch members apart, which portion can be returned to its initial position to again restore the driving relation of the said clutch members.

Another object is to construct a clutch the parts of which will lend themselves to automatic disengagement when placed under overload and maintain such disengagement, and which can be restored manually to their initial positions.

Another object is to construct a clutch in connection with a knuckle-joint, or universal-joint, usually interposed between driving and driven elements, for instance as used with various types of farm machinery such as grain-dumps, elevators, and the like, where horse power or other form of power is employed.

Another object is to provide a clutch of the type treated on herein constructed of parts adapted to automatically separate on overload, and include means whereby the point of disengagement can be predetermined.

Another object is to provide a clutch which will not be dependent upon frangible parts adapted to break under load, and which must be replaced by like parts in order to restore the clutch to working condition.

Other objects and advantages will appear herein aided by the accompanying drawing forming a part of this application and in which letters and figures of reference correspond with those of the specification.

Figure 1 is a side elevation of my clutch showing a part in section. Fig. 2 shows the face of one of the driving elements of the clutch. Fig. 3 is an end elevation of an element adapted to lie upon that shown in Fig. 2 including certain members of a third element, which members are shown in cross section. Fig. 4 is a side elevation of the assembled clutch showing the separation of the clutching parts. Fig. 5 is a longitudinal section of parts of the clutch. Fig. 6 is a side elevation of a ring and part of one of the clutch portions, and Fig. 7 is an end elevation of one of the clutch members shown in the other figures.

The two engaging or clutching elements of the clutch are indicated each as a whole by the letters A and B. The former comprises a disk-like member or plate C, Fig. 2, preferably provided with a central depression or socket D. Between said depression and the periphery of the member or plate is a series of spaced sockets E two opposite walls of which, as shown in Fig. 4, lie at opposite angles, the purpose of which will appear later herein. The outer face of the plate is provided with a pair of extending lugs or ears F between which the usual loose connection G for the driven element is carried as shown or this said loose connection G may be engaged by the power element such as a gas engine, horse power, or the like. The part B consists of a disk-like member or plate H similar to and adapted to lie upon the plate C, both the plates having plain surfaces except for the preferred central socket D which receives an extension H' of the plate H but permitting free rotation of the two plates relatively. Projecting from the other or opposite surface of the plate H is a series of extensions $H^2$ corresponding in number and position to the sockets E and provided with openings J extending perpendicularly to the plane of the said plate. The plate also has a hub K provided with a socket L at its outer end which is of square or other irregular form to receive the end of a tumbling rod or other element L' either connected with the power or with the machine to be driven, though other means for providing for loose connection may be used.

M is a sleeve which is placed upon the hub K and provided with a circumferential flange N. It is provided on its surface facing the member B with a series of fingers or lugs O slidably fitting the openings J of the extensions $H^2$ described. These lugs are provided with opposite angled faces corresponding to the walls of the sockets, see broken lines in Figs. 1 and 4, and adapted to fit into the said sockets.

The sleeve M is further provided with a series of arc-shaped flange portions or fingers P clearly illustrated in Fig. 7, between which are spaces P'. Said flange portions or fingers extend toward the plate H of the member B beyond the face of the flange N. They also extend into the bore of the sleeve a short distance, as shown in section in Fig. 1 in order to gain strength, their inner ends constituting a seat for an expanding spring Q encircling the hub K and placed under compression by means of a nut R adapted to screw upon the threaded outer end of the said hub K, there being, in addition, a locknut S or equivalent means for holding the nut R securely in a desired adjustment.

Encircling the hub adjacent the plate H is a ring T, Fig. 6, provided with an extension U which lies between two of the extensions $H^2$ of said plate H, there being an expanding spring V interposed between one of the extensions and said extension U. The ring is further provided with a series of lugs or fingers W extending in the direction of the sleeve M and adapted to engage with the flange portions P thereof by entering the spaces P' therebetween, see Fig. 1. The surfaces of the ends of the lugs are formed at an angle to the plane of the plate H, as clearly shown in the figures, the purpose of which will be understood presently. A cap screw or other suitable part A' extends centrally through the plate C into the hub K and serves to retain the members A and B in connected relation but permits the said members to rotate relatively.

Operation: The power transmitted from one of the clutch members to the other is due to the seating of the fingers or lugs O in the sockets E, being held in that relation under any desired pressure through the spring Q, as explained, the tension of the latter being gaged and maintained through the nut R. For purposes of description either of the members B, C, may be the driving or driven elements. Let it be supposed that the driving force required is a thousand pounds for transmitting motion to the elevator, wagon-jack or other machine. The spring is therefore placed under such a tension that the machine will operate under normal load. Beyond this point however the clutch members must be disengaged due to overload that may become dangerous and cause breakage of the machine.

In driving elevators and some other types of machines used on the farm obstructions of one kind or another or the breakage of some part of the driven machine which causes overload, brings the machine to an abrupt stop and unless some means is provided for instantly disconnecting the power considerable damage through breakage of other parts of the mechanism will likely result. In view of this it has been common practice to connect the two members of a driving element by means of frangible members such as oaken or other hardwood pins, which are sheared off when the danger point is reached. Frequently the attendant in failing to provide himself with additional pins for replacing broken ones will resort to the dangerous practice of substituting a bolt or other metal part as a quick repair. This becomes a risk because of increased danger of breaking the machine in case of overload. In view of this, it is my purpose to provide a clutch of the nature herein described in which it is quite impossible to get beyond the danger point and wherein the parts of the clutch after separation are held separated by the automatic action of a third part which is always present and needs no replacing as in the case of the breakable pins referred to.

My structure provides that when the danger point is reached or where the breakage of parts is imminent the interruption of the rotation of the driven part during the continued rotation of the power must result by forcing the fingers or lugs O out of the sockets E due to the angled walls of the latter and the corresponding angle of said fingers or lugs. As the latter are thus forced outward, increasing the distance between the plate C and the sleeve M, the flange portions P of the latter in moving with the said sleeve are drawn from between the lugs or fingers W of the ring T to such a point that, as indicated in Fig. 4, the latter can rotate upon the hub due to the spring V the said lugs or fingers W thus being enabled to pass by the extremities of said fingers or lugs O as partially indicated in Fig. 4. One of the parts A, B, the driving part, will now rotate while the other, the driven, will remain idle. This relation is maintained until the operator by grasping the extension U, which constitutes a finger-piece, moves the ring back against the tension of its spring V to permit the spring Q to cause reëngagement of the clutch portions, the device being then in operation as before until a following automatic disengagement takes place.

The operation is absolutely positive the clutch being thrown out after the load increases beyond a predetermined point and thus held disengaged by the ring as explained.

The purpose of forming the sockets E and fingers O with angled opposite faces is that the clutch may act to drive both right or left hand, the parts having equal opportunity to disengage in either direction of rotation.

The office of the cam-like angled faces of the projections W is that even though the points of the fingers O after long use become worn so that they are not thrown as far out as when newly placed in service, the said angled faces will engage the ends of the flange portions P resulting in the positive locking apart of the said fingers O and the plate C.

It is seen that there are no parts intended to be sheared and which after being sheared must be removed and replaced by another before the machine can be started, and no insertion of a part can be or need be made such as would endanger breakage of the machine parts. Again, the absolutely positive operation and the positive manner in which the clutch portions are held apart insure against maiming persons engaged in making repairs about the machine although the power member may still be in operation.

In some cases it may be desired to eliminate the ring T from the structure so as to permit the fingers or lugs O to pass out of and into successive recesses E against the tension of the spring Q whenever overload of the driven machine occurs although in practice in certain machines it is preferable to include said ring.

I am aware of a number of devices used for the purpose of automatically disengaging a driving from a driven element under overload including means of one form or another to maintain the separation of the elements. None of them, however, employs a member, the equivalent of my member T, placed between the disengaging parts and automatically given a partial turn after the separation of the said parts to place extending portions of said member between said parts and hold them separated in a positive manner, nor are the parts permitted to come together for reëngagement by the simple partial rotation, manually, of the member T. My structure, therefore, is new and novel throughout, it is simple in form, and its action is absolutely positive.

I have described my preferred structure but I desire to state that various changes may be made therein such as will accomplish the purposes described all without departing from the intent of the invention and the spirit of the claims.

Having described my invention, I claim:—

1. A device of the character described including in its construction two rotatable portions, a member adapted for movement in a direction parallel to the axis of rotation of the portions including a part adapted in said movement to secure both said rotatable portions relatively in driving relation and adapted by its structure and that of one of the portions to be moved to interrupt said driving relation on overload, means to hold the member elastically in its position to maintain the driving relation of the portions, and an elastically controlled member adapted to engage behind the described member when forced out to hold it in its disengaged position.

2. A device of the character described including in its construction two rotatable portions, a member adapted for movement in a direction parallel to the axis of rotation of the portions including a part adapted to secure both said rotatable portions relatively in driving relation, one of the latter and the member having engaging surfaces formed whereby the said member is moved outward under overload to interrupt said driving relation, means to hold the member elastically in the direction of and upon the portion with whose surface it engages, a member adapted to enter between one of the portions and the first described member when the latter is forced out to maintain separation thereof, and means constantly tending to move the second described member between the described parts.

3. A device of the character described including in its construction two rotatable portions, a member including a part adapted to engage both portions and secure them relatively in driving relation, said part and one of said portions being formed whereby the part is moved outward under overload to terminate the driving relation of the said two portions, means to hold the member elastically in the direction of the portions for the described engagement, and a member disposed between the portions and the first described member adapted to automatically engage between one of said portions and said first member and maintain separation thereof when the latter and its part has been moved outward.

4. A device of the character described including in its construction two rotatable portions, a member including a part adapted to engage both portions and secure them relatively in driving relation, said part and one of said portions being formed whereby the part is moved outward under overload to terminate the driving relation of the said two portions, means to hold the member elastically in the direction of the portions for the described engagement, a member disposed between the portions and the first described member adapted to automatically engage between one of said portions and said first member and maintain separation thereof when the latter and its part has been moved outward, and means to move the second described member automatically to engage between the said portions and said first member at the time described.

5. A device of the character described including in its construction two rotatable facing portions, one of them having a recess in its face having angled walls, a member including a part to engage in said recess and having faces corresponding to those of the recess adapted to be forced from the recess under overload, means to hold the member and its part elastically in the direction of and to engage the described portion having said recess to secure both said portions in driving relation, said member including a series of extensions facing the portions, and a member interposed between the first said member and the said portions and likewise provided with projections facing those of the said first described member and adapted to engage them, and means to automatically move the second described member to cause the engagement of the projections of both members at the time the first described member is forced outward to maintain its separation from the said portion having the recess.

6. A device of the character described including in its construction two rotatable facing portions, one of them having a recess in its face, a member in permanent driving relation to the other portion including a part to engage in the said recess and adapted by its form and the form of the wall of the recess to be forced from the latter under overload, means to hold the member and its parts elastically in the direction of the described portions for securing both said portions in driving relation, said member also having a projection, a second member interposed between the first said member and one of the said portions and likewise provided with a projection facing in the direction of and to engage that of the said first member, elastic means to move one of the said members whereby its projection is placed opposite that of the other when the first member is shifted due to overload, the ends of the said projections adapted to abut and maintain separation of the said part of said first member from the said portion having the recess.

7. A device of the character described including in its construction two rotatable facing portions, one of them having a recess in its face, the walls of which are formed at an angle to the direction of rotation, a member including a part to engage in said recess, means to hold the part elastically in said recess, said part adapted to secure the portions in driving relation and having a cam surface to engage the walls of said recess, and adapted to be forced from the recess under overload, the said member including a series of extensions facing the portions, and a member interposed between the first said member and the said portions and like-wise provided with projections adapted to normally lie between the extensions of the first member when the latter is in driving engagement with the recess of the described portion, elastic means constantly tending to rotate the second described member relative to the first and adapted, when the first described member and its part is moved away from the portions under overload, to rotate said second member whereby the ends of its projections are made to lie opposite and engage the ends of the projections of the first described member and maintain the disengaged position of the latter.

8. A device of the character described including in its construction two rotatable facing portions, a part carried by one of the portions and rotatable with it, the other portion having a series of recesses, the said part including extensions to engage the recesses, the recesses and the ends of the extensions being formed whereby to disengage said part from said portion having the recesses when the device is placed under overload, means to elastically hold the extensions in the said recesses, a member rotatable with one of the portions to engage and hold the said part thereof disengaged from the recessed portion, and a spring to automatically move said member to its engaging position, said member including a part in position to be manually engaged.

9. A device of the character described comprising two rotatable facing portions, one of them having a series of recesses in its face adjacent the other, said other portion including a series of openings adapted to register with the recesses, a member adapted to move parallel to the axis of the portions and permanently engaging the portion having the openings and including a series of extensions each lying within one of the said openings and adapted to engage in the described recesses, the latter and the ends of the extensions being formed whereby said extensions are ejected under overload, means to elastically hold the said member in the direction of the recessed portion, a member lying between the portion having the openings and the first said member and provided with a series of projections facing the first described member, the latter also having a series of projections extending in the direction of those of the second described member and lying between them in the driving relation of the parts of the device, a spring engaging the second described member and adapted when the extensions of the first member are ejected to rotate said second member and place the ends of its projections opposite those of the first described member for abutting upon them for maintaining the first member in its disengaged position.

10. A device of the character described comprising two rotatable facing portions, one of them having a series of recesses in its face adjacent the other, said other portion including a series of openings adapted to register with the recesses, a member adapted to move parallel to the axis of the portions and permanently engaging the portion having the openings and including a series of extensions each lying within one of the said openings and adapted to engage in the described recesses, the latter and the ends of the extensions being formed whereby said extensions are ejected under overload, means to elastically hold the said member in the direction of the portion having the recesses, a member lying between the portion having the openings and the first said member and provided with a series of projections facing the first described member, the latter also having a series of projections extending in the direction of those of the second described member and lying between them in the driving relation of the parts of the device, a spring engaging the second described member and adapted when the extensions of the first member are ejected to rotate the second described member and place the ends of its projections opposite those of the first described member for abutting upon them for maintaining the first member in its disengaged position, the engaging ends of the projections being formed at an angle to the direction of rotation.

11. A device of the character described including in its construction two portions, one having a recess in its face, a member including a part to seat in the recess and engage the other portion for connecting both in driving relation and including a beveled face, means to hold the part yieldingly in the recess, the portion having said recess adapted to eject the said part when the device is subjected to an overload, a member interposed between the portions and a part of the first member and having a projection provided with a beveled face to engage that of the said first member, and means to rotate the second described member relative to the device.

12. A clutch including a driving and a driven portion, a member having permanent driving relation with one of them and movable relative to it parallel to its axis of rotation, and adapted to engage the other said portion whereby to connect said portions in driving relation, means to hold said member elastically in its described engagement but permitting it to be disengaged to move outward under overload, a second member rotatable with the described parts and lying between the portions and the first said member and adapted to engage behind the latter when moved outward, and means to rotate said second member to place it behind said first member.

13. A clutch including a driving and a driven portion, a member having permanent driving relation with one of them and movable relative to it parallel to its axis of rotation, and adapted to engage the other portion to connect both the portions in driving relation and also adapted to be disengaged from said other portion under overload, means to hold said member elastically in its engaging and driving relation, a second member rotatable with the described parts between the first said member and the said portions and adapted to engage behind the said first member when disengaged, and elastic means to rotate the second member to its position for engaging behind said first member, the latter including an integral extension in position to be manually engaged to move it out of engagement with said first member.

14. A clutch comprising in its construction a driving and a driven part, a member mounted on and rotatable with one of the parts and adapted to engage the other by which rotation is imparted from one to the other of said parts, said member adapted to be disengaged from the part with which it engages when the clutch is placed under overload, and means adapted in either direction of rotation of the clutch to engage and hold the member disengaged and adapted to be manually operated to remove it from engagement with said member, said means having a recess at each side thereof whereby external manually operated means may engage the same during the rotation of the parts.

15. A clutch comprising in its construction two parts, one adapted to rotate relatively to the other, a member carried by one of them adapted to engage the other whereby both clutch parts are made to rotate in unison, said member adapted to be ejected automatically from the part with which it engages when the clutch is placed under overload, means carried by one of the parts of the clutch adapted to have movement in either direction about the axis of the same, and including a part to be moved into the path of said member to hold it disengaged after its ejection, said means adapted to be retarded manually during either direction of rotation of the clutch.

16. A clutch comprising two parts, one adapted to rotate relatively to the other, a member permanently carried by one of the parts including a lateral extension, said member arranged to have movement in a direction parallel to the axis of rotation of the parts and adapted to engage the other of the parts, and adapted also to be ejected from the latter under overload, means also carried by one of the parts adapted for a limited movement in either direction about the axis of the same including an extension adapted to automatically engage behind the lateral extension of the member after the ejection of that member, said means adapted in either direction of rotation of the clutch to be manually operated to remove the extension from behind said lateral extension, and means constantly tending to move said last named means to carry its extension into the path of said extension of said member.

17. In a clutch, the combination of two rotatable parts, their axes of rotation being coincident, a member mounted on one of them and rotatable therewith and adapted for movement relatively to said part in a direction parallel to its axis of rotation and adapted to engage the other of the parts in that movement whereby both clutch parts will be rotated in unison, a spring to elastically hold the member in such engagement, means mounted upon and rotatable with one of the parts adapted for a movement in both directions about the axis of rotation of said part and including an extension adapted to lie in the path of movement of the member when it has received its described movement in one direction, a spring to elastically hold the said means in the path of the movement of said member, said means adapted during either direction of rotation of the clutch to be manually retarded to move its said extension out of the path of said member.

In testimony whereof I affix my signature, in presence of two witnesses.

HARVEY V. GIBSON.

Witnesses:
  W. I. SLEMMONS,
  L. M. THURLOW.